United States Patent [19]
Andersson

[11] Patent Number: 6,157,138
[45] Date of Patent: Dec. 5, 2000

[54] APPARATUS FOR ILLUMINATING AN ELECTROLUMINESCENT LAMP THAT PRESERVES BATTERY POWER

[75] Inventor: Håkan Andersson, Malmö, Sweden

[73] Assignee: Telefonaktiebolaget LM Ericsson, Stockholm, Sweden

[21] Appl. No.: 09/223,787

[22] Filed: Dec. 31, 1998

[51] Int. Cl.[7] .................................................. G09G 3/10
[52] U.S. Cl. ............................... 315/169.3; 315/160
[58] Field of Search ........................... 315/169.3, 209 R, 315/160, 169.1, 174, 176; 363/16

[56] References Cited

U.S. PATENT DOCUMENTS

| | | |
|---|---|---|
| 4,527,096 | 7/1985 | Kindlmann . |
| 4,864,182 | 9/1989 | Fujioka et al. . |
| 4,888,523 | 12/1989 | Shoji et al. . |
| 5,216,331 | 6/1993 | Hosokawa et al. . |
| 5,235,253 | 8/1993 | Sato . |
| 5,313,141 | 5/1994 | Kimball . |
| 5,336,978 | 8/1994 | Alessio ................................. 315/169.3 |
| 5,349,269 | 9/1994 | Kimball ................................ 315/169.3 |
| 5,463,283 | 10/1995 | Sanderson . |
| 5,502,357 | 3/1996 | Kimball . |
| 5,557,175 | 9/1996 | Wood . |
| 5,559,402 | 9/1996 | Corrigan, III . |
| 5,566,064 | 10/1996 | Schoenwald . |
| 5,594,305 | 1/1997 | Primm et al. . |
| 5,668,703 | 9/1997 | Rossi et al. ............................... 363/16 |
| 5,686,796 | 11/1997 | Sanderson ........................... 315/209 R |

FOREIGN PATENT DOCUMENTS

| | | |
|---|---|---|
| 0372181 | 6/1990 | European Pat. Off. . |
| 0699015 | 2/1996 | European Pat. Off. . |
| 0743808 | 11/1996 | European Pat. Off. . |
| 0782373 | 7/1997 | European Pat. Off. . |

*Primary Examiner*—Don Wong
*Assistant Examiner*—Chuc Tran
*Attorney, Agent, or Firm*—Burns, Doane, Swecker & Mathis, L.L.P.

[57] ABSTRACT

An inverter circuit for a battery operated devices includes an EL device that is driven by the inverter circuit. The inverter circuit preserves battery power by recycling battery current stored in the EL device. A charging circuit charges the EL device to a first voltage level during a charge cycle. A discharge circuit subsequently discharges the battery current stored in the EL device back into the battery.

19 Claims, 3 Drawing Sheets

APPARATUS FOR ILLUMINATING AN ELECTROLUMINESCENT LAMP THAT PRESERVES BATTERY POWER

BACKGROUND OF THE INVENTION

This invention generally relates to the field of illumination circuits and, more particularly, to illumination circuits that illuminate EL devices.

Because of their compact size and low current consumption, EL devices are widely used in small battery operated electronic devices. For example, such lamps are used for backlighting liquid crystal displays in portable communication devices, such as cellular telephones. Essentially, an EL device is a capacitor with a phosphorous dielectric. The lamp emits light when it is excited by applying a sufficiently high AC voltage across its electrodes. To emit light continuously, the lamp must be charged and discharged at a low frequency during successive charge and discharge cycles. For this reason, the drive signal for the EL device is a high-voltage, low-frequency AC drive signal. Depending on the size of the EL device and the desired illumination intensity, this signal can have a voltage level in the range of 100–150 volts and a frequency in the range of 100–400 Hz.

In battery operated devices, a battery supplies a DC supply voltage in the range of 1–5 volts that powers a device in which the EL device is used. Such a voltage is significantly lower than the voltage level required to illuminate the lamp. Therefore, an electronic device that uses EL device typically includes an inverter circuit which converts the low DC supply voltage to a high-voltage, low-frequency AC drive signal. Various types of inverter circuits have been used in the past to convert a DC supply voltage to an AC drive signal, including transformers and bridge inverter circuits.

Another conventional inverter circuit uses a pump circuit in which the energy stored in an inductor is switched at high speed to produce a series of high voltage pulses. These pulses successively charge the EL device to a sufficiently high voltage level during a charge cycle. One of the advantages offered by such an inverter circuit is that by increasing the switching frequency, the size of the inductor can be reduced, thereby reducing the size of the inverter circuit. During a discharge cycle, the energy stored in the EL device is discharged to ground through a short circuit. In a pending patent application titled "An Inverter Circuit For Illuminating An Electroluminescent Lamp", which is hereby incorporated by reference, the Applicant of the present invention has disclosed presenting a damping circuit on the discharge path of the EL device in order to reduce humming noise. By closing and opening a discharge switch at a low frequency, the inverter pump circuit produces a low-frequency AC drive signal across the EL device.

In battery operated devices, the battery life is of utmost importance. For this reason, various techniques are being devised to minimize battery current drain at various device circuits, including EL inverter circuit. Therefore, there exists a need for an EL inverter circuit that preserves battery power.

SUMMARY OF THE INVENTION

Briefly, according to the present invention an inverter circuit powered by a battery recycles battery current stored in an EL device. The inverter circuit, which illuminates the EL device during repetitive illumination cycles, includes a charge circuit and a discharge circuit. The charge circuit stores battery current in the EL device during a charge cycle. Subsequently, during a discharge cycle, the discharge circuit discharges the stored battery current back into the battery.

According to one of the more detailed features of the invention, the discharge circuit includes a damping circuit that dampens the transition from a first voltage level across the EL device during the discharge cycle, thereby avoiding the steep transitions that produce humming noise. In an exemplary embodiment of the present invention, an illumination cycle includes a positive charge cycle followed by the discharge cycle. Alternatively, the illumination cycle includes a negative charge cycle followed by the discharge cycle.

In other more detailed features of the invention, the charge circuit includes an inductor and a charge switch. By connecting and disconnecting the inductor to the battery at high frequency via the switch, the charge circuit charges the EL device to a high voltage level. The discharge circuit includes a switch that connects the EL device to the battery during the discharge cycle. Preferably, the inverter circuit includes a positive charge pump circuit and a negative charge pump circuit that supplies voltage levels needed for controlling the switch.

Other features and advantages of the present invention will become apparent from the following description of the preferred embodiments, taken in conjunction with the accompanying drawings, which illustrate, by way of example, the principles of the invention.

DETAILED DESCRIPTION OF THE PREFERRED EMBODIMENTS

Figure 1:
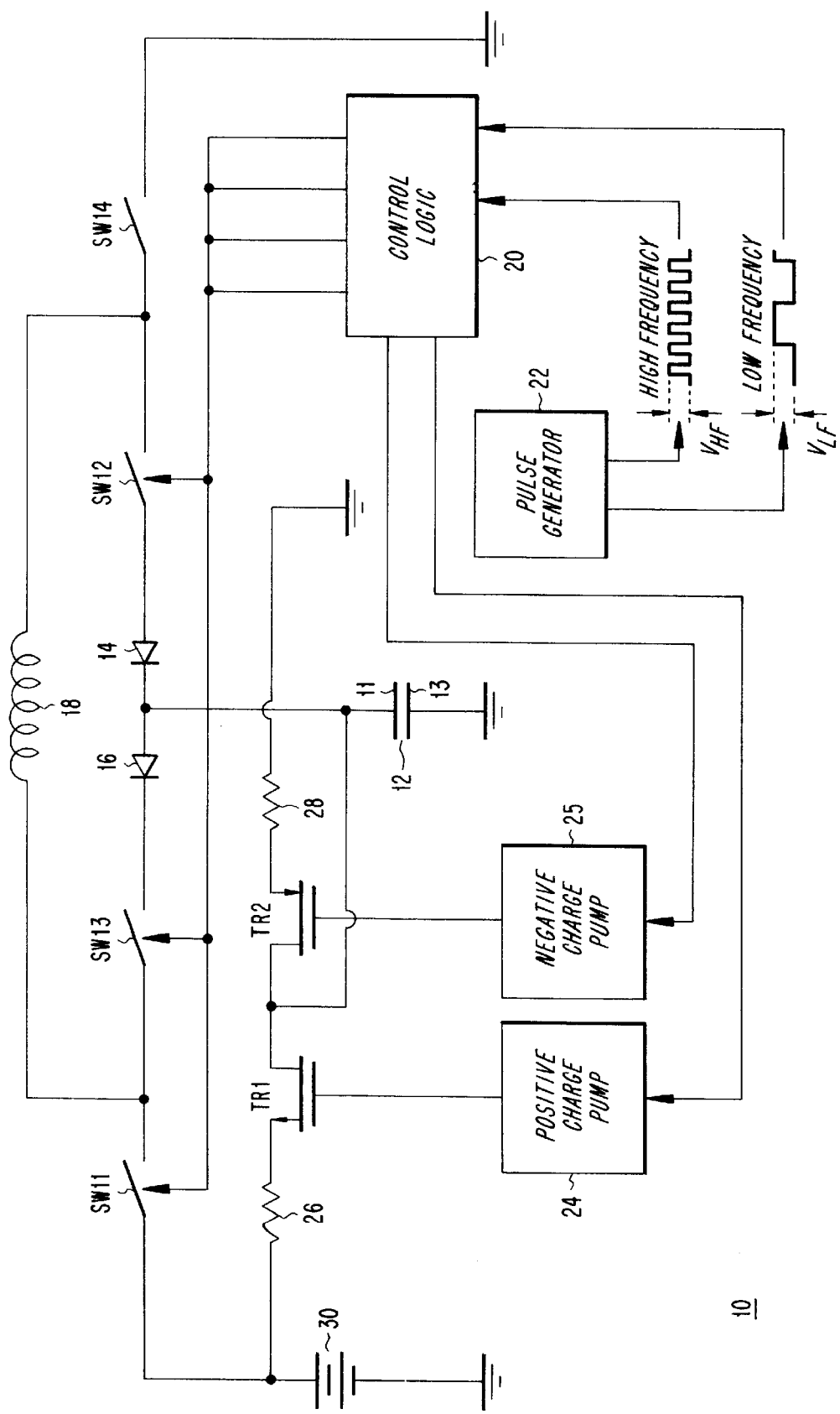
FIG. 1 is a schematic diagram of an inverter circuit according to one embodiment of the present invention.

With reference to FIG. 1, an inverter circuit 10 according to one embodiment of the invention is shown. In an exemplary embodiment of the invention, the inverter circuit 10 is incorporated in a battery operated communication device, such as a portable cellular phone. The inverter circuit 10 produces an AC drive signal that illuminates an EL device 12 during repetitive illumination cycles. For example, the EL device 12 may be used for backlighting phone's LCD display.

The inverter circuit 10 includes switches SW11–SW14, transistor switches TR1 and TR2, diodes 14 and 16, an inductor 18, a control logic 20, a pulse generator 22, a positive charge pump circuit 24, a negative charge pump circuit 25, and damping resistors 26 and 28. An energy storage device, such as a battery 30, supplies a battery voltage that powers all of the phone's circuitry, including the inverter circuit 10. The AC drive signal produced by the inverter circuit 10 charges the EL device 12 with battery current during charge cycles and discharge it during discharge cycles. According to the present invention, during a cycle, battery charge current stored in the EL device 12 is discharged into the battery 30, thereby recycling the battery charge current to preserve battery power. The charge current in the EL device 12 is discharged into the battery 30 by coupling a battery terminal to a charged electrode of the EL device 12. In order to provide the charge and discharge path, TR1 and TR2 which are preferably high power CMOS switches coupled between the battery and the EL device, are turned on and off.

The control logic 20 selectively controls voltage levels applied to the bases of TR1 and TR2 to place TR1 and TR2 in ON and OFF states. The control logic 20 applies a first control signal to the positive charge pump circuit 24, which generates a TR1 base voltage that is more positive than the battery voltage to turn TR1 on. Similarly, the control logic 20 applies a second control signal to the negative charge pump circuit 25, which generates a TR2 base voltage that is more negative than ground to turn TR2 on. The potential levels of the TR1 and TR2 base voltages are of course dependent on fabrication technology used for fabricating TR1 and TR2. For example, if TR1 and TR2 are fabricated using bipolar technology, for turning on TR1, the base voltage should be more positive than +0.6 volt, and for turning on TR2, the base voltage should more negative than −0.6 volt. On the other hand, if CMOS fabrication technology is used, TR1 base voltage should more positive than +2.5 volts, and TR2 base voltage should be more negative than −2.5 volts.

The positive and negative charge pump circuits 24 or 25 are well known capacitive or inductive pump circuits. The pulse generator 22 generates high frequency (HF) and low frequency (LF) control pulses that are applied to the control logic circuit 20 for switching the SW11–SW14 between OPEN and CLOSED states. During successive time periods T1–T4, the control logic 20 controls the switching states of SW11–14 and TR1 and TR2 according to TABLE 1 shown below.

TABLE 1

| | SW11 | SW12 | SW13 | SW14 | TR1 | TR2 |
|---|---|---|---|---|---|---|
| T1 | CLOSED | CLOSED | OPEN | OSC | OFF | OFF |
| T2 | CLOSED | X | OPEN | OPEN | OSC | OFF |
| T3 | OSC | OPEN | CLOSED | CLOSED | OFF | OFF |
| T4 | OPEN | OPEN | X | CLOSED | OFF | OSC |

X: DON'T CARE

In a first switching state during T1 time period, the control logic circuit 20 closes SW11, which couples the positive terminal of the battery 30 to one terminal of the inductor 18. The control logic also closes SW12 to couple the other terminal of the inductor 20 to a first electrode 11 of the EL device 12 through the diode 14 and opens SW13 to isolate the first electrode 11 from the battery terminal. During this time period, the first and second control signals turn OFF TR1 and TR2 to disconnect the discharge path between the battery 30 and the EL device 12. By switching SW14 at a high frequency, in response to HF pulses provided by the pulse generator, the inverter circuit 10 incrementally charges the EL device 12 with battery current. While being charged in this manner, the voltage across the EL device 12 incrementally increases to a positive voltage level $V_{positive}$.

More specifically, when SW14 is opened and closed at a high frequency, the inductor 18 produces a series of high voltage pulses, which successively charge the EL device to the positive voltage level $V_{positive}$. When the switch SW14 is closed, the inductor 18 stores battery current. Subsequently, when the switch SW14 opens, the electrical field on the inductor 18 collapses, directing the stored battery current in the inductor 18 to the EL device 12, through the forward biased diode 14. As a result, the inductor charges the upper electrode of the EL device 12 with positive charges. As the process of opening and closing SW14 continues at high frequency, the EL device 12 incrementally charges until it reaches the positive voltage level $V_{positive}$. Accordingly, the inductor 18, the switch SW14 and the diode 14 constitute a charge circuit that charges the EL device during positive charge cycles.

As described above, according to the invention the inverter circuit 10, during a subsequent T2 time period, discharges the stored battery current in the EL device 12 back into the battery 30. Under the control of the control logic 20, the positive charge pump circuit 24 generates a control voltage at the base of TR1 that has depending on the fabrication technology, has a suitably more positive voltage than the battery voltage to turn TR1 on. At the same time, the negative charge pump circuit 25 generates a suitable voltage level at the base of TR2 that keeps TR2 turned off. In this way, during the discharge cycle, the control logic 20 controls opening of the switch SW13 and, preferably oscillates TR1, to provide the discharge path between the EL device 12 and the battery 30. Preferably, the discharge path includes the damping resistor 26 that is coupled between the first electrode 11 of EL device 12 and of the positive terminal of the battery 30. As a consequence, the EL device 12 is discharged in a prolonged manner through the damping resistors 26 and 28, thereby reducing undesired humming noise. The value of the damping resistors 26 and 28 are selected to create a suitable RC time constant for an equivalent damping discharge circuit under this switching state. It would be appreciated, however, that according to the present invention, upper electrode of the EL device 12 may be directly coupled to the positive battery terminal to discharge the stored battery current into the battery 30 without a damping circuit.

In a third switching state, during T3 time period, the control logic 20 closes switches SW13 and SW14 and opens switch SW12. The control logic 20 turns OFF TR1, while switching SW11 at high frequency. Similar to T1 time period, the high switching frequency of the switch SW11 incrementally charges the EL device 12. When the switch SW11 is closed, the inductor 18 stores the battery current. When the switch SW11 is opened, the collapsing electrical field directs the stored battery current stored the EL device 12 through ground. As a result, the inductor 18 charges a second electrode 13 of the EL device 12, causing the voltage across the EL device 12 to be negative relative to ground. As the process of opening and closing the switch SW6 continues at high frequency, the EL device 12 incrementally charges until it reaches a negative voltage level $V_{negative}$, which has an opposite polarity relative to the positive voltage level $V_{positive}$. Accordingly, the inductor 18, the switch SW11 and the diode 16 constitute a charge circuit that negatively charges the EL device 14 during negative charge cycles.

Figure 2:
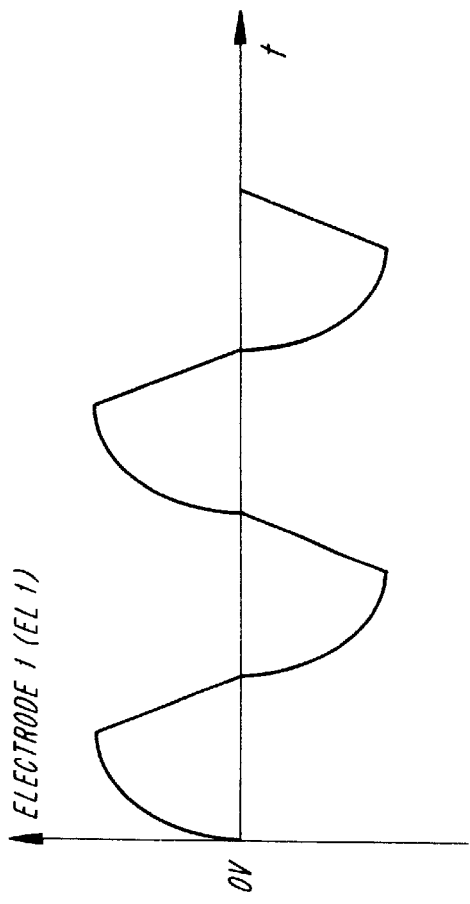
FIG. 2 is a timing diagram of an AC drive signal produced by the inverter circuit of FIG. 1.

Finally, in a fourth switching state, during T4 time period, the control logic 20 turns off TR1 and oscillates TR2, thereby creating a discharge path between the EL device 12 and the battery 30 via the damping resistor 28. Therefore, the inverter circuit 10 of the invention recycles the battery current stored in the EL device 12 during both negative and positive charge cycles. Repeating the process of charging the switching states of the switches SW11–SW14 and TR1 according to TABLE 1 produces a drive signal across the first electrode 11 of the EL device the timing diagram of which is shown in FIG. 2.

Figure 3:
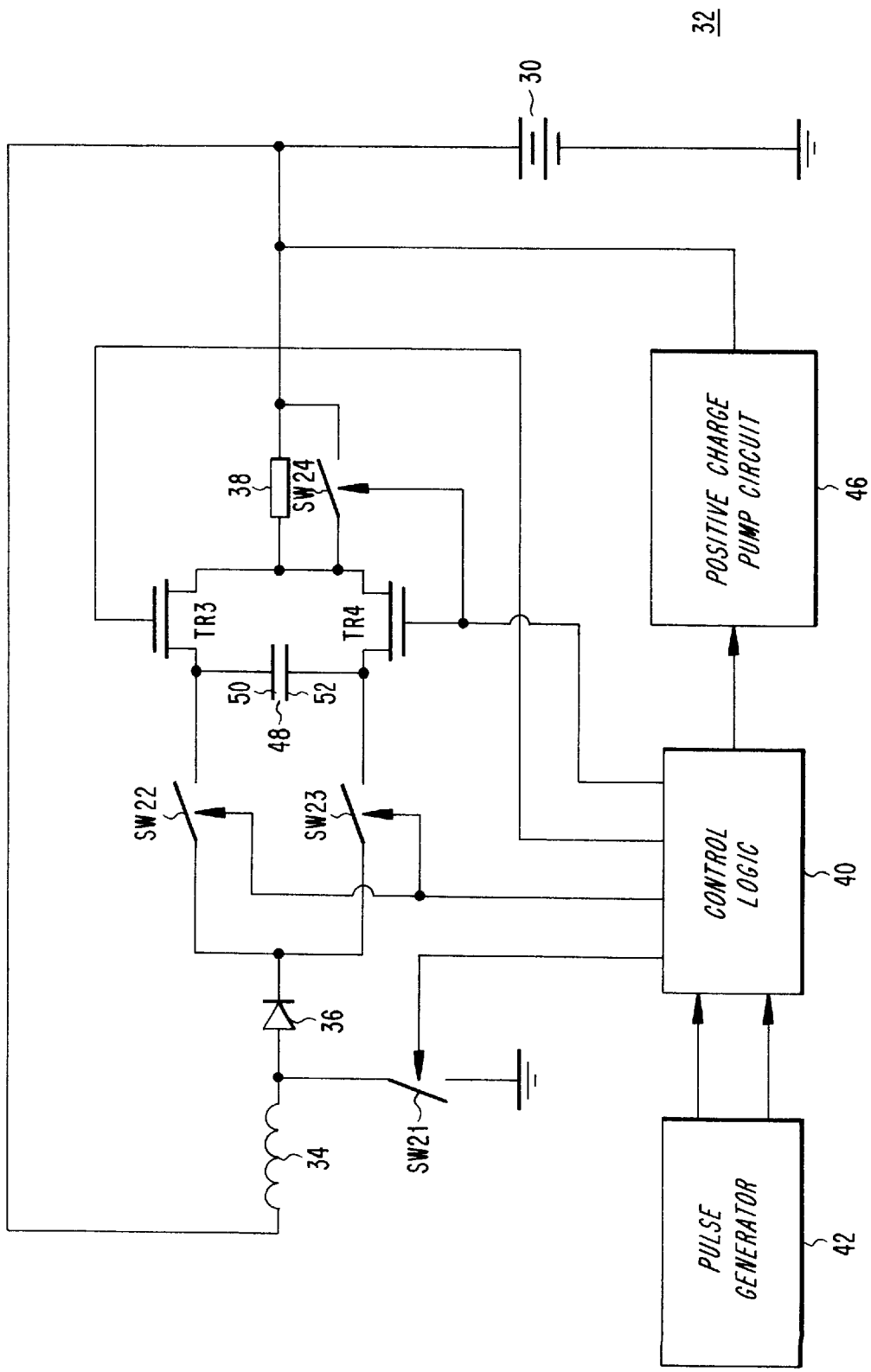
FIG. 3 is a schematic diagram of an inverter circuit according to another embodiment of the present invention.

With reference to FIG. 3, another embodiment of an inverter circuit 32 according to the present invention is shown. The inverter circuit 32 includes an inductor 34, a diode 36, switches SW21–SW24, transistor switches TR3 and TR4, a damping resistor 38, a control logic 40, a pulse generator 42, a positive charge pump circuit 46, and an EL device 48. Unlike the inverter circuits of FIG. 1, during charge and discharge cycles, the inverter circuit 32 alters the charge on first and second electrodes 50 and 52 of the EL device 48. According to this aspect of the present invention, the inverter circuit 32 is configured to include the inductor 34 in the discharge loop of the EL device 14 to further dampen the discharge transitions. By forming a discharge loop that includes the inductor 34 in series with the damping resistor 38, this embodiment of the inverter circuit 32 produces a substantially linear drive signal across the EL device 48. Applying a substantially linear drive signal across the EL device 48 significantly extends its operating live.

According to this embodiment, the battery 30 provides a supply voltage for illuminating the EL device 48. Similar to the arrangement of FIG. 1, the positive charge pump circuit 46, which may be a capacitive or inductive pump circuit, provides a boosted voltage for controlling TR3 and TR4. In response to HF and LF control pulses generated by the pulse generator 42, the control logic circuit 40 controls the operation of this embodiment of the inverter circuit 32 according to Table 2.

TABLE 2

|    | SW21 | SW22 | SW23 | SW24 | TR3 | TR4 |
| --- | --- | --- | --- | --- | --- | --- |
| T1 | OSC | ON  | OFF | ON  | OFF | ON  |
| T2 | OFF | OFF | ON  | OFF | ON  | OFF |
| T3 | OSC | OFF | ON  | ON  | ON  | OFF |
| T4 | OFF | ON  | OFF | OFF | OFF | ON  |

Operationally, in one switching state during T1 time period, the SW21 is opened and closed at high frequency to charge the first electrode 50 of the EL device 48 with battery current via the inductor 34, the diode 36. During this period, SW22, SW24, and TR4 are turned ON and SW23 and TR3 are turned OFF, to charge the EL device 12 to a positive level voltage $V_{positive}$. Under this arrangement, SW24 creates a direct connection between the second electrode 52 and the positive terminal of the battery 30 during this charge cycle. It should be noted that SW24 may comprise a transistor switch that is turned on and off by providing a suitable voltage level at its base. That is, in order to turn it on, a suitably more positive voltage than battery voltage must be applied to TR4's base. Furthermore, it should be noted that as illustrated by Table 2, SW22 and TR3 have opposite switching states relative to each other. Similarly, according to Table 2, SW23 and TR4 have opposite switching states. Therefore, SW22 and SW23 may comprise SCRs that are controlled based on the switching states of TR3 and TR4, respectively, thereby eliminating the need to control SW22 and SW23 independently. The use of semiconductor technology for fabricating all switching elements allows the converter of the present invention to be integrated using a suitable fabrication technology.

Figure 4:
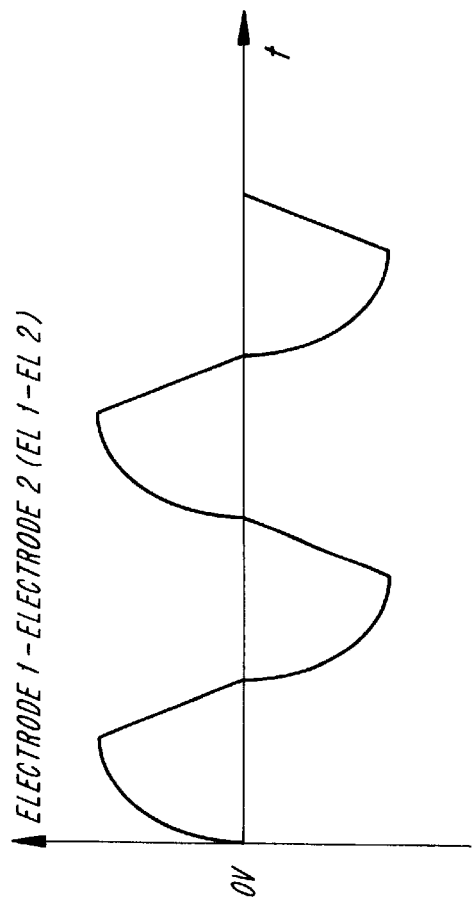
FIG. 4 is a timing diagram of an AC drive signal produced by the inverter circuit of FIG. 3.

During a subsequent time period T2, SW21, SW22, SW24, and TR4 are turned OFF and SW23 and TR3 are turned ON, thereby connecting the first electrode 50 to the positive terminal of the battery 30 via the damping resistor 38. As a result, battery current stored in the first electrode 50 is discharged into the battery 30. During T3 time period, with SW23, SW24 and TR3 turned ON and SW22 and TR4 turned OFF, the high frequency switching of SW21 charges the second electrode 52 with battery current via the inductor 34, the diode 36. Similar to T1 time period, the ON state of SW24 provides a direct connection between the first electrode 50 and the battery 30. Finally, during T4 time period, SW21, SW23, and TR3 are turned OFF, and SW22 and TR3 are turned ON. As a result, the charged second electrode 52 is connected to the positive terminal of the battery 30 via the damping resistor 38, to recycle the battery current back into the battery 30. Under this arrangement, the first and second electrodes 50 and 52 are coupled, either directly or through the damping resistor 38, to the positive terminal of the battery during the charge and discharge cycles. FIG. 4 shows a timing diagram of a drive signal generated across the first and second electrodes 50 and 52 by the inverter circuit of FIG. 3.

From the foregoing description, it would be appreciated that the disclosed embodiments of the inverter circuit of the present invention reduce power consumption by recycling battery current stored in an EL device. Consequently, the inverter circuit of the invention preserves battery power and increases battery life of a battery operated device. In this way, the battery operated device can be operated for a longer period of time.

Although the invention has been described in detail with reference only to the presently preferred embodiments, those skilled in the art will appreciate that various modifications can be made without departing from the invention. Accordingly, the invention is defined only by the following claims which are intended to embrace all equivalents thereof.

What is claimed is:

1. An apparatus for illuminating an EL device during repetitive illumination cycles, comprising:
   a battery generating a battery voltage;
   a charge circuit coupled to the battery that stores battery current in the EL device during a charge cycle; and
   a discharge circuit that discharges the stored battery current into the battery during a discharge cycle, wherein the discharge circuit discharges the EL device into the battery through a damping circuit.

2. The apparatus of claim 1 further including a control logic that controls the charge and discharge circuits.

3. The apparatus of claim 2, wherein the discharge circuit includes a switch that under the control of the logic circuit couples the battery to the EL device.

4. The apparatus of claim 3, wherein the switch is a transistor switch being turned on by a control voltage that is more positive than the battery voltage.

5. The apparatus of claim 3, wherein the control voltage that is more positive than the battery voltage is generated by a positive charge pump circuit.

6. The apparatus of claim 3, wherein the switch is a transistor switch being turned on by a control voltage that is more negative than ground.

7. The apparatus of claim 6, wherein the control voltage that is more negative than ground is generated by a negative charge pump circuit.

8. The apparatus of claim 2 further including a pulse generator for generating control pulses, wherein the control logic is responsive to the control pulses for controlling the charge and discharge cycles.

9. The apparatus of claim 1, wherein the El device includes first and second electrodes, wherein the first and second electrodes are coupled to a positive terminal of the battery during the charge and discharge cycles.

10. The apparatus of claim 1, wherein the illumination cycles include positive and negative charge cycles, and wherein the discharge circuit discharges the stored battery current in the EL device during the positive and negative charge cycles into the battery.

11. The apparatus of claim 1, wherein the damping circuit includes a resistor.

12. The apparatus of claim 1, wherein the charge circuit includes an inductor and a switch for connecting and disconnecting the inductor to the battery at high frequency.

13. The apparatus of claim 12, wherein the inductor is included in the discharge circuit during the discharge cycle.

14. A method for operating an EL device, comprising:

charging the EL device to a first voltage level during a charge cycle; and discharging the EL device through a discharge circuit into a battery during a discharge cycle coupling a damping circuit between the EL device and the battery during the discharge cycle.

15. The method of claim 14, wherein the EL device charges to voltage levels that are both positive and negative with respect to an initial level during respective positive and negative charge cycle, and the EL device discharges during a discharge cycle occurring subsequent to each one of the positive and negative charge cycles.

16. An apparatus for operating an EL device, comprising:

an energy storage means;

means for charging the EL device to a first voltage level during a charge cycle;

means for discharging the EL device into the energy storage means during a discharge cycle; and means for dampening the transition from the first voltage level.

17. The apparatus of claim 16, wherein the means for dampening includes a resistor.

18. The apparatus of claim 16, wherein the EL device charges to a voltage level that is both positive and negative with respect to an initial level during respective positive and negative charge cycles, and the EL device discharges into the energy storage means during a discharge cycle occurring subsequent to each one of the positive and negative charge cycles.

19. A portable communication device operated by a battery, comprising:

an EL device;

an inverter circuit for illuminating the EL device during repetitive illumination cycles;

a charge circuit coupled to the battery that charges the EL device during a charge cycle; and a discharge circuit that discharges the EL device, through a dampening resistor, into the battery during a discharge cycle.

* * * * *